US008806984B1

(12) United States Patent  
Bell

(10) Patent No.: US 8,806,984 B1  
(45) Date of Patent: Aug. 19, 2014

(54) LAMP CHANGERS

(76) Inventor: Mark Bell, Kyle, TX (US)

( * ) Notice: Subject to any disclaimer, the term of this patent is extended or adjusted under 35 U.S.C. 154(b) by 276 days.

(21) Appl. No.: 12/767,772

(22) Filed: Apr. 26, 2010

(51) Int. Cl.
  *H01K 3/32* (2006.01)
(52) U.S. Cl.
  USPC .......................................... 81/53.12; 81/53.11
(58) Field of Classification Search
  USPC ............ 81/53.1, 53.11, 53.12, 125; 294/99.1, 294/184
  See application file for complete search history.

(56) References Cited

U.S. PATENT DOCUMENTS

| | | | | | |
|---|---|---|---|---|---|
| 519,354 | A | * | 5/1894 | Sheppard | 200/331 |
| 801,902 | A | * | 10/1905 | Olafson | 81/53.12 |
| 1,056,084 | A | * | 3/1913 | Bates | 81/53.12 |
| 1,311,776 | A | * | 7/1919 | Rodriguez | 81/53.12 |
| 1,449,358 | A | * | 3/1923 | Weber | 81/53.11 |
| 1,658,017 | A | * | 1/1928 | Grinnell | 81/53.11 |
| 2,294,193 | A | * | 8/1942 | Merriman | 81/125 |
| 2,545,043 | A | * | 3/1951 | Odenthal | 81/53.11 |
| 2,555,381 | A | * | 6/1951 | Thisse | 81/53.11 |
| 2,556,701 | A | * | 6/1951 | Mozena | 81/53.11 |
| 2,562,071 | A | * | 7/1951 | Stueland | 81/53.12 |
| 2,607,620 | A | * | 8/1952 | Oliveri | 294/187 |
| 2,634,999 | A | * | 4/1953 | Fjeld | 81/53.11 |
| 2,637,587 | A | * | 5/1953 | Robinson | 81/53.11 |
| 2,752,811 | A | * | 7/1956 | Wenchel | 81/125 |
| 2,766,060 | A | * | 10/1956 | Fuller | 81/53.11 |
| 2,956,462 | A | * | 10/1960 | Paul | 81/125 |
| 3,397,602 | A | * | 8/1968 | Estep et al. | 81/64 |
| 3,651,720 | A | * | 3/1972 | Indyk | 81/124.5 |
| 3,670,605 | A | * | 6/1972 | Heim et al. | 81/125 |
| 4,314,723 | A | * | 2/1982 | Vermillion | 81/53.11 |
| 4,663,996 | A | * | 5/1987 | Grudgfield et al. | 81/53.11 |
| 5,074,172 | A | * | 12/1991 | Fetter et al. | 81/125 |
| 5,074,173 | A | * | 12/1991 | Cearley | 81/177.6 |
| 5,103,695 | A | * | 4/1992 | Dolle et al. | 81/53.11 |
| 5,231,733 | A | * | 8/1993 | Dittman | 16/412 |
| 5,361,654 | A | * | 11/1994 | Rasipovits | 81/64 |
| 5,379,666 | A | * | 1/1995 | Held | 81/53.1 |
| 5,809,850 | A | * | 9/1998 | Tickner | 81/53.11 |
| 5,960,682 | A | * | 10/1999 | Yamashita | 81/125 |
| 6,048,014 | A | * | 4/2000 | Stefanik | 294/99.1 |
| 6,320,608 | B1 | * | 11/2001 | Yap et al. | 348/73 |
| 6,374,709 | B1 | * | 4/2002 | Vasichek et al. | 81/125 |
| 6,467,379 | B1 | * | 10/2002 | Wizman | 81/185 |
| 6,666,329 | B1 | * | 12/2003 | Charbonneau | 206/218 |
| 6,870,114 | B2 | * | 3/2005 | Cole et al. | 200/341 |
| 6,883,400 | B2 | * | 4/2005 | Sugano | 81/53.11 |
| 7,066,511 | B2 | * | 6/2006 | Newman et al. | 294/210 |
| 7,223,011 | B2 | * | 5/2007 | Wright | 362/647 |
| D636,645 | S | * | 4/2011 | Bell | D8/14 |
| 2004/0206210 | A1 | * | 10/2004 | Tryba | 81/53.1 |
| 2005/0087042 | A1 | * | 4/2005 | Huang | 81/124.5 |
| 2011/0247462 | A1 | * | 10/2011 | Schildmeier | 81/53.11 |

* cited by examiner

*Primary Examiner* — Robert Scruggs  
(74) *Attorney, Agent, or Firm* — Joe Zheng

(57) ABSTRACT

Devices for changing a light bulb (e.g., a compact fluorescent lamp or CFL), especially for those installed in high places, are disclosed. The device has a cylindrical tubular structure with one end opening to accommodate a light bulb. In one embodiment, at least one flexible thin arm with one end shaped to form a hook is pivotably affixed to the tubular structure. In another embodiment, a shaped insert is disposed in the tubular structure to provide necessary friction force to hold the light bulb in place during the changing process. The present invention is suitable for changing various types of CFLs.

17 Claims, 4 Drawing Sheets

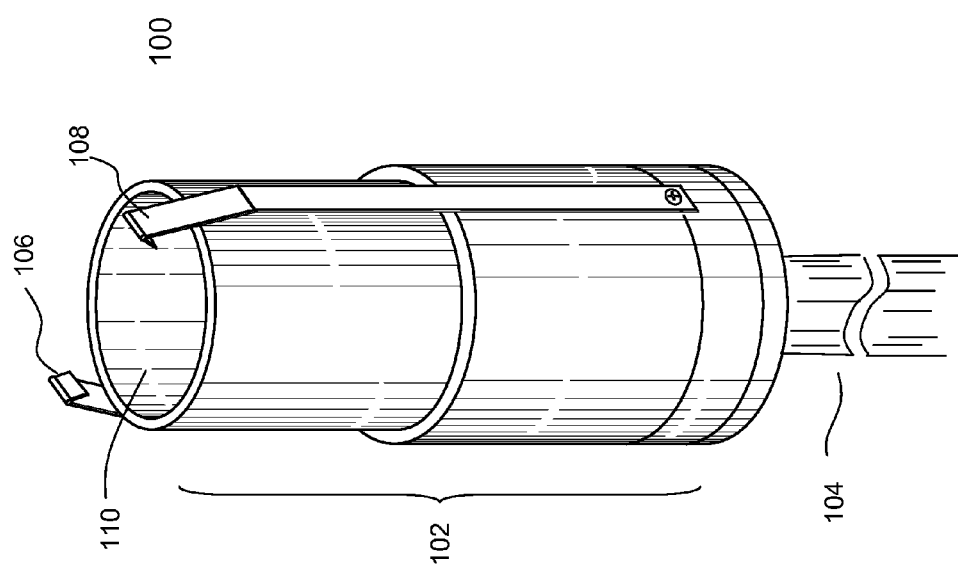

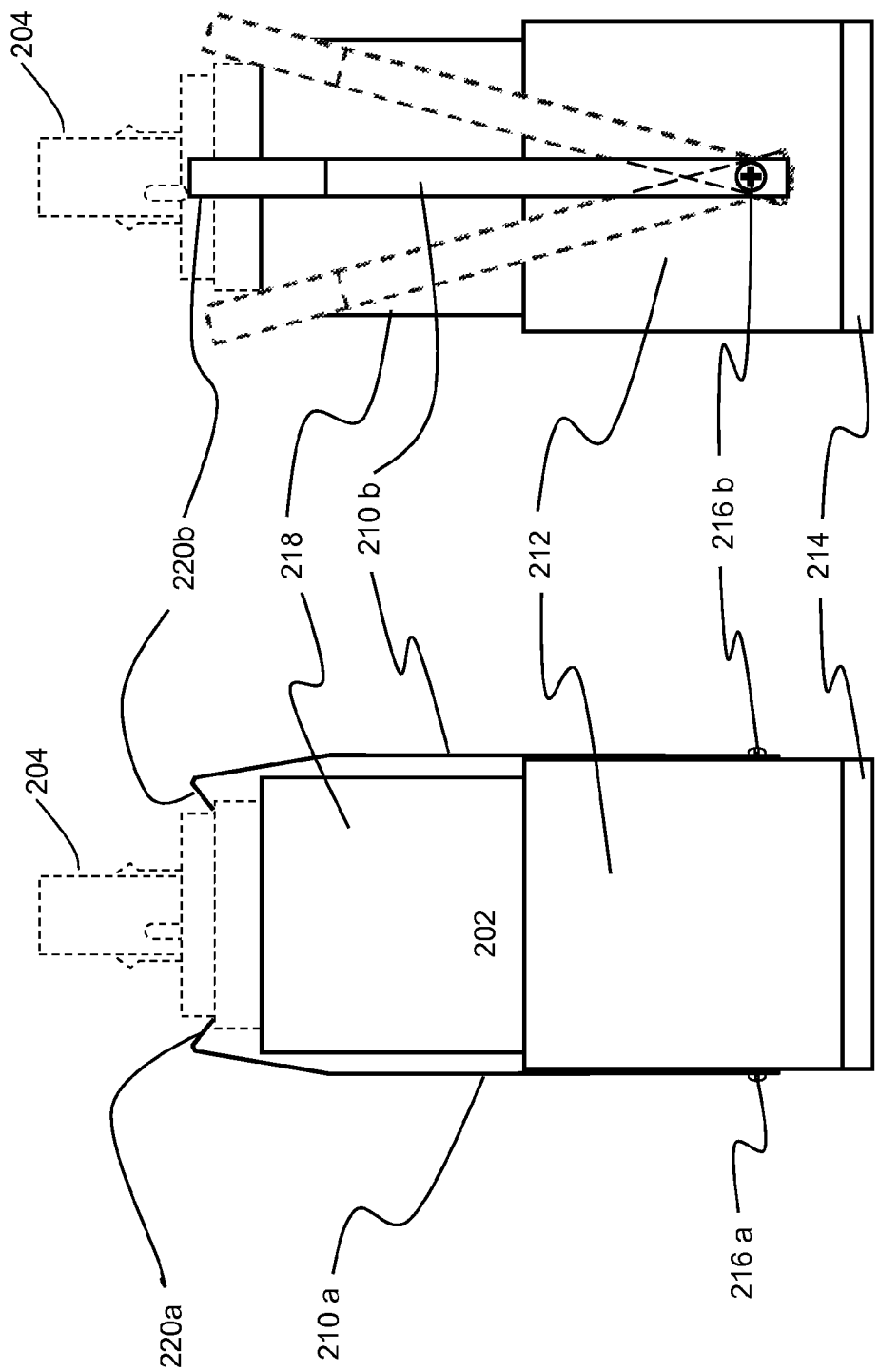

LAMP CHANGERS

BACKGROUND OF THE INVENTION

1. Field of the Invention

The present invention generally relates to mechanical devices for extracting and installing electrical devices, and more particularly, relates to devices for changing light bulbs.

2. Description of Related Art

As a way of reducing energy consumption, energy efficient compact fluorescent lamps (CFLs) are being widely used to replace the traditional high energy consumption incandescent light bulbs.

A typical CFL is constructed in two parts: a base housing the electronic ballast circuits, and one or more gas-filled, phosphor-coated, sealed glass tube, or compact fluorescent tubes (CFT), connected to the ballast circuit. The base of a CFL is configured to fit into a light fixture outlet. When electricity is introduced, the ballast circuit provides the required electrical conditions to turn on the CFL. In general, CFLs are installed either by screwing into a light fixture or by inserting into a detent socket.

While most incandescent bulbs have almost identical uniform spherical bulb shapes, the shapes and contours of CFLs may be different significantly. The CFL base may be in circular shape or a square with rounded corners; the glass of the CFL may be in spiral curls or in tubular form with multiple turns; the diameter and the length of CFLs may also vary depending on the illumination flux, wattage and application. All these variables increase the complexity of a CFL changer.

Lights are now being installed in many high places, for example, the ceiling of a lobby. Installing or changing CFLs installed in high places is not as simple as changing incandescent light bulbs. Because of the complex shapes and the variations in their configurations, many CFLs cannot be installed using devices designed for installing regular incandescent light bulbs, such as suction cups, or tools with multiple prongs, or "fingers" for grapping a light bulb. Changing a CFL requires extracting and reinserting the CFL into a socket. None of the existing light bulb changing tools is sufficient to perform such a task. Scaffolds or high ladders are usually required for workers to reach the CFL in high places in order to change them manually.

To reduce the potential injury risks of working from an elevated platform or high ladders, and to reduce the maintenance time, there is a definite need for a device which can readily change lights (e.g., CFLs) installed in high places.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to a device for extracting and installing specially formed light bulbs (e.g., CFLs), especially for those installed in high places. According to one aspect of the present invention, the device comprises a cylindrical tubular structure with its inside diameter large enough to accommodate a desired light bulb. With at least one flexible arm extended beyond the tubular structure and inwards to reach the light bulb, the device is capable of extracting and installing a variety of light bulbs. According to another aspect of the present invention, a shaped insert disposed in the tubular structure to readily hold the glass part of a light bulb to screw the light bulb in or out of a socket. A bore at the bottom of the device, when attached to a long or extendable pole, allows the device to be used for changing light bulbs installed in high places.

According to yet another aspect of the present invention, the tubular structure is rubberized or includes a rubber ring to be applied to the visible portion of a light bulb. By the pressure and friction between the bulb and the rubber part in contact, a user can turn the bulb in or out a light base (e.g., a socket).

The present invention may be implemented in many forms including a method, a system, an apparatus, or a part of a system. According to one embodiment, the present invention is a device for changing a light bulb, the device comprising: a cylindrical tubular structure having a top opening to accommodate the light bulb; and at least one flexible arm, the arm having a hooked end, extended beyond the cylindrical tubular structure and inwards, wherein the hooked end of the arm snaps onto a recess portion of the light bulb when the light bulb is accommodated to a certain depth.

According to another embodiment, the invention is a device for changing a light bulb, the device comprising: a cylindrical tubular structure having a top opening; and a shaped insert disposed in the cylindrical tubular structure to accommodate the light bulb and cause the light bulb to rotate when the cylindrical tubular structure is caused to rotate.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 1 shows a light bulb changer according to one embodiment of the invention;

FIGS. 2A and 2B show a front view and a side view of the embodiment shown in FIG. 1;

DETAILED DESCRIPTION OF THE INVENTION

Figures 3A, 3B:
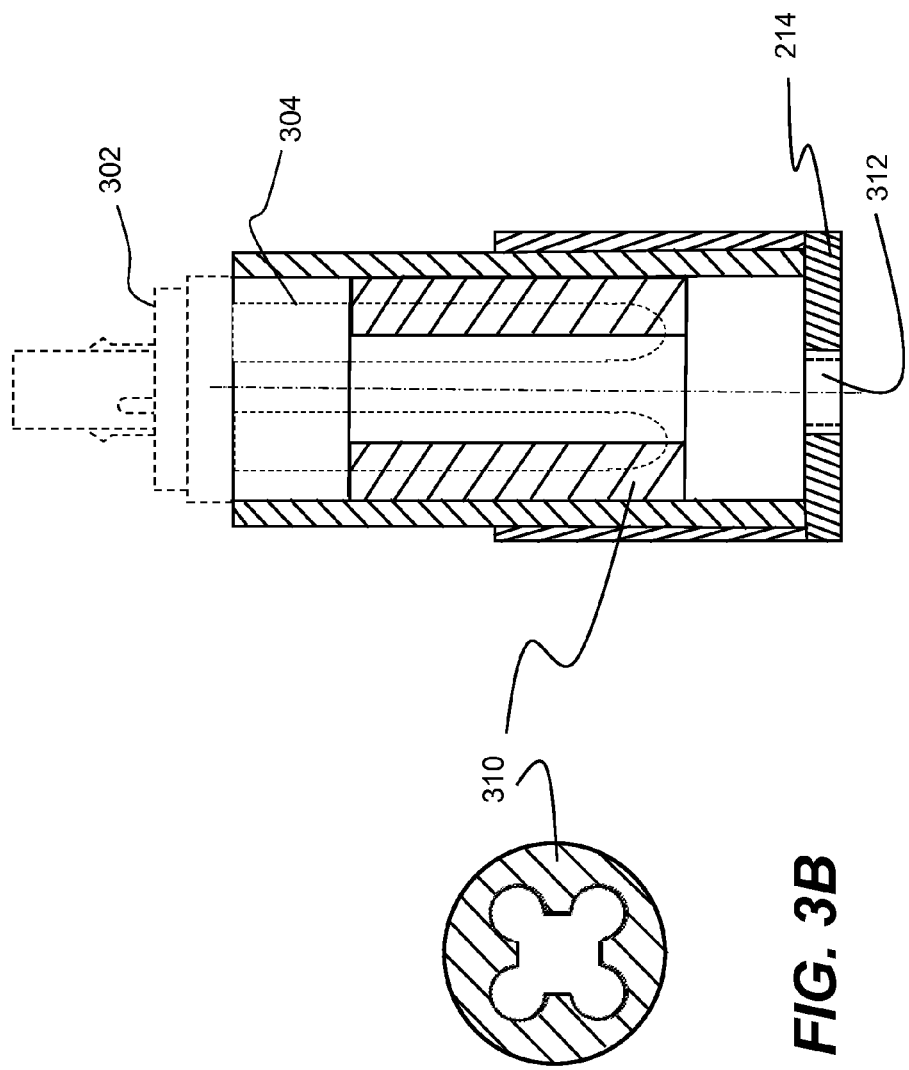
FIG. 3A shows a longitudinal cross-sectional view of a light bulb changer according to another embodiment of the invention.
FIG. 3B shows a horizontal cross-sectional view of an exemplary shaped-insert.

The detailed description of the invention is presented largely in terms of procedures, steps, logic blocks, processing, and other symbolic representations that directly or indirectly resemble the operations of one or more mechanical devices. These process descriptions and representations are typically used by those skilled in the art to most effectively convey the substance of their work to others skilled in the art.

Numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Referring now to the drawings, in which like numerals refer to like parts throughout the several views. FIG. 1 shows an exemplary light bulb changer 100 according to an embodiment of the invention. The changer 100 is provided to grab a light bulb (e.g., a compact fluorescent lamp or CFL) to release it from a socket where the light bulb was previously installed. Without implying any limitation to embodiments of the present invention, a CFL is used throughout the description herein.

The changer 100 has a cylindrical tubular structure or cup 102 with one end opened to accommodate a CFL. The other end of the tubular structure is closed with a base plate having a bore near its center. An interlocking mechanism, for example, threads, is provided in the bore to accept a pole 104. In general, the diameter of the cup 102 is larger than that of a CFL. Two flexible arms 106 and 108, shaped to form a hook at one end, are extended beyond the cup 102 and inwards to narrow down the diameter of the cup 102. As a result, the base of a CFL can be reached by the two arms 106 and 108 when the CFL is being accommodated in the cup 102.

Depending on implementation, the cup 102 may be made as a single piece or with two retractable sections. FIG. 1 shows that the cup 102 includes two sections. Thus the length of the cup 102 is extendable with two or more tubular sections to accommodate different lengths of light bulbs. FIG. 1 shows that two arms 106 and 108 are attached to the tubular structure 102 on the other end. Those skilled in the art can appreciate that the two arms 106 and 108 can be attached or affixed to the cup 102 in many ways.

FIGS. 2A and 2B show respectively a front and a side view of the light bulb changer 100 of FIG. 1. A cylindrical tubular structure 202 provided to accommodate a CFL 204 has a top opening end with a first cylindrical wall 218 extended by a second cylindrical wall 212. These two cylindrical walls 212 and 218 may be extendable or retractable to a desirable length if needed. Two arms 210a and 210b have one end attached to the cylindrical tubular structure 202 by mechanical screws 216a and 216b. It should be noted that any method that can affix the flexible arms 210a and 210b and allow them to be pivotally moved if needed may be used. The current invention is not limited to the mechanical screws disclosed herein.

The other end of the arms 210a and 210b extended beyond the top opening of the tubular structure 218 is bent into a sharp-turn "hook", (e.g., "hooked-end" 220a and 220b). The length and the shape of the flexible arms 210a and 210b are constructed such that when the device 100 slides over to retract a CFL 204, the hooked-ends are capable of snapping back to catch the recess portion of the CFL 204. It should also be noted that the number of the flexible arms is not limited to two as disclosed herein. For example, any substantially evenly spaced multiple arms are also workable. FIGS. 1, 2A and 2B illustrate that there are two arms that can be used to snap onto the base of a light bulb. Those skilled in the art can appreciate that the tabular structure may include a single arm, three or more arms that shall work equally well to hold a light bulb. Optionally, a base plate 214 is attached to an end opposite to the opening end of the tubular structure 202.

To retract or remove a compact fluorescent tubes (CFT) bulb, a user may slide the cup 102 of FIG. 1 over the CFT and push until the hooked-ends of the flexible arms 106 and 108 snap and catch the recessed portion of the CFT seat. A straight pull from the pole causes the CFT seat to be separated from its base.

FIG. 3A is a longitudinal cross-sectional view of another embodiment of the invention. Disposed in the cylindrical tubular structure 202 is a shaped insert 310. The shaped insert 310 is made of either a firm yet compliant material, such as rubber or high density foam, and molded or fabricated into a shape that is roughly matching the surface contours of a specific style of CFL 302, or a flexible deformable material, which conforms dynamically to the surface contour of the light bulb. During the removal or installation process, the interference between the shaped insert 310 and the light bulb 304 provides a static friction for holding the CFL 302. Illustrated in FIGS. 3A and 3B is a shaped insert for a four-tube tubular-style CFL. FIG. 3B shows a horizontal cross-sectional view of the illustrated shaped insert 310. Shaped inserts for other specific types of CFL, for example, spiral curl CFL, can also be made for changing the respective types of CFLs. A bore 312 near the center of the base plate 214 is provided with suitable detent or threads to receive a pole.

To use the device to change a CFL installed in high places, where the CFL has to be screwed in or out, an operator first selects the device 100 with an appropriate shaped-insert 310 that either matches or dynamically conforms to the contours of the CFL, and then attaches an extended pole through the detent or the threads in the bore 312. When the CFL is accommodated in the shaped-insert 310, the operator may rotate the changer to screw the CFL in or out a socket.

In operation, the CFL is snuggly held by the shaped insert 310 as the device 100 slides over the CFL, and can be safely removed. In the case that a CFL is broken during the removal or installation, because the CFL is enclosed by the tubular structure 202 and the bottom plate 214, any fragments from the breakage will be securely contained within the device 100. The opacity of the wall of the device 100 also provides a good barrier in blocking out the light from the CFL before it was removed, allowing the operator to see well during the CFL changing process.

Figure 4:
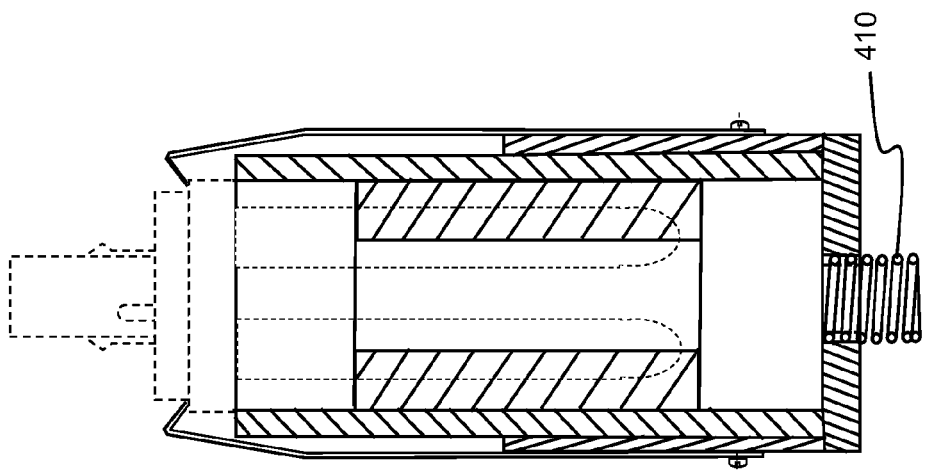
FIG. 4 shows a cross-sectional view of another embodiment of the invention with a flexible torsional spring.

To install a light bulb that requires insertion to a socket: away the hooked ends of the flexible arms may be swung to clear the opening end of the device 100. A light bulb to be installed is placed in the cup of the device 100. While aligning the device 100 to the socket where the light bulb to be inserted, a user may push the device 100, directly or indirectly from the attached pole, FIG. 4 shows another embodiment of the invention for changing light bulbs installed in a slant acute angle from the vertical position. The bore 312 at the bottom plate 214 is fit with a stiff and bendable torsional spring 412, which is to be coupled to a pole, or an extendable rod. The spring 412 provides some degree of tolerance and allows the pole to turn or push/pull in an angle deviated from the longitudinal axis of the cylindrical tubular structure 202. Therefore, light bulbs installed in a slant angle may be changed through the same procedures as they were in a vertical position.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. For example, the tubular structure is rubberized or includes a rubber ring to be applied to the visible portion of a light bulb. By the pressure and friction between the bulb and the rubber part in contact, a user can turn the bulb in or out a light base (e.g., a socket) by rotating the tubular structure via a rod or extended holder. Accordingly, the scope of the present invention is defined by the appended claims rather than the forgoing description of embodiments.

What is claimed is:

1. A device for changing a light bulb, the device comprising:
    a cylindrical tubular structure having a top opening to form an enclosed cup to accommodate the light bulb therein; and
    at least one flexible arm being pivotally attached to the cylindrical tubular structure and rotatable sideways, the arm having a hooked end, extended from an exterior of the cylindrical tubular structure, beyond the top opening of the cylindrical tubular structure and inwards to reach a recess portion of the light bulb, wherein the hooked end of the at least one flexible arm snaps onto the recess portion of the light bulb when the light bulb is accommodated to a certain depth of the cup, the at least one flexible arm is pivotally rotated sideways to release the hooked end off the recess portion of the light bulb so that the light bulb can be taken out of the enclosed cup.

2. The device as recited in claim 1, wherein the cylindrical tubular structure includes at least two sections coaxially arranged.

3. The device as recited in claim 2, wherein the two sections are extendable or retractable.

4. The device as recited in claim 1, further comprising a base plate affixed to the cylindrical tubular structure to form the cup.

5. The device as recited in claim 4, wherein there is a bore in the base plate that is threaded.

6. The device as recited in claim 4, wherein the bore in the base plate is fit with a bendable torsional spring.

7. The device as recited in claim 4, wherein the bore in the base plate is equipped with a releasable detent mechanism.

8. The device as recited in claim 1, wherein one end of the at least one flexible arm is pivotally attached to the cylindrical tubular structure by a screw so that the other end of the at least one flexible arm can be pivotally rotated.

9. The device as recited in claim 1, wherein the light bulb is a compact fluorescent lamp.

10. A device for changing a light bulb with multiple tubes, the device comprising:
    a cylindrical tubular structure having a top opening to form a cup;
    a shaped insert removably disposed in the cup in the cylindrical tubular structure to accommodate the light bulb and cause the light bulb to rotate when the cylindrical tubular structure is caused to rotate, wherein the shaped insert is made from a flexible material and has an internal space formed to roughly match surface contours of the multiple tubes of the light bulb, inherent interference between some flexibility of the shaped insert and the multiple tubes of the light bulb provides a static friction for holding the light bulb; and
    at least one flexible arm being pivotally attached to the cylindrical tubular structure, the arm having a hooked end, extended from an exterior of the cylindrical tubular structure, beyond the top opening of the cylindrical tubular structure and inwards to reach a recess portion of the light bulb to hold up the light bulb.

11. The device as recited in claim 10, wherein the cylindrical tubular structure includes at least two sections coaxially arranged.

12. The device as recited in claim 11, wherein the two sections are extendable or retractable.

13. The device as recited in claim 10, further comprising a base plate affixed to the cylindrical tubular structure to form a cup.

14. The device as recited in claim 13, wherein there is a bore in the base plate that is threaded.

15. The device as recited in claim 14, wherein the bore in the base plate is fit with a bendable torsional spring.

16. The device as recited in claim 13, wherein the bore in the base plate is equipped with a releasable detent mechanism.

17. The device as recited in claim 10, wherein the flexible material is rubber or high density foam.

* * * * *